US010190605B2

United States Patent
Le Coq

(10) Patent No.: US 10,190,605 B2
(45) Date of Patent: Jan. 29, 2019

(54) NACELLE FOR AN AIRCRAFT TURBOJET ENGINE PROVIDED WITH A HYDRAULIC ROTO-LINEAR ACTUATOR OF A THRUST REVERSER AND OF A VARIABLE-SECTION NOZZLE

(71) Applicant: Safran Nacelles, Gonfreville L'Orcher (FR)

(72) Inventor: Vincent Le Coq, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 0 days.

(21) Appl. No.: 16/010,750

(22) Filed: Jun. 18, 2018

(65) Prior Publication Data
US 2018/0298924 A1 Oct. 18, 2018

Related U.S. Application Data

(63) Continuation of application No. PCT/FR2016/053408, filed on Dec. 14, 2016.

(30) Foreign Application Priority Data

Dec. 17, 2015 (FR) ...................................... 15 62676

(51) Int. Cl.
*F02K 1/76* (2006.01)
*F15B 15/06* (2006.01)
(Continued)

(52) U.S. Cl.
CPC ............. *F15B 15/063* (2013.01); *F02K 1/09* (2013.01); *F02K 1/15* (2013.01); *F02K 1/763* (2013.01);
(Continued)

(58) Field of Classification Search
CPC .......... F16B 15/063; F02K 1/15; F02K 1/763; F05D 2270/64
See application file for complete search history.

(56) References Cited

U.S. PATENT DOCUMENTS 3,814,324 A * 6/1974 Wanger .................... F02K 1/12
239/127.3
2006/0272492 A1 12/2006 Matsumoto et al.
(Continued)

FOREIGN PATENT DOCUMENTS

GB 2446441 8/2008
GB 2449281 11/2008
(Continued)

OTHER PUBLICATIONS

International Search Report for PCT/FR2016/053408, dated Mar. 10, 2017.

*Primary Examiner* — Andrew H Nguyen
(74) *Attorney, Agent, or Firm* — Burris Law, PLLC

(57) ABSTRACT

The present disclosure concerns a nacelle for an aircraft turbojet engine that includes a thrust reverser having a cowl displaceable between a deployed position and a stowed position, a fixed structure, and a secondary nozzle. The nozzle includes panels movable in rotation, and hydraulic actuators for sequenced actuation of the cowl and panels. The actuators include a body mounted on the fixed structure, and a rod mounted in the body and is linked to the cowl and panels via a device for transmitting movement of the actuator to the panel. An actuation system having a hydraulic control device controls the displacement of the rod of the actuator. The actuator further includes a device for alternately displacing the rod in translation relative to the body to cause translation of the cowl, or in rotation relative to the body to cause rotation of the nozzle panel.

16 Claims, 3 Drawing Sheets

(51) Int. Cl.
  *F15B 11/22*   (2006.01)
  *F15B 15/26*   (2006.01)
  *F02K 1/09*    (2006.01)
  *F02K 1/15*    (2006.01)

(52) U.S. Cl.
  CPC ............ F15B 11/22 (2013.01); F15B 15/261 (2013.01); *F05D 2220/323* (2013.01); *F05D 2270/64* (2013.01); *F15B 2211/7107* (2013.01); *F15B 2211/72* (2013.01); *F15B 2211/782* (2013.01); *Y02T 50/671* (2013.01)

(56) References Cited

U.S. PATENT DOCUMENTS

| | | | |
|---|---|---|---|
| 2012/0137654 A1 | 6/2012 | Burgess | |
| 2012/0137656 A1* | 6/2012 | Jones | ............... F02K 1/763 |
| | | | 60/226.2 |
| 2013/0160425 A1* | 6/2013 | Scanlon | ............ F01D 17/02 |
| | | | 60/226.3 |

FOREIGN PATENT DOCUMENTS

| | | |
|---|---|---|
| JP | S60110704 | 7/1985 |
| JP | S63003502 | 1/1998 |

\* cited by examiner

NACELLE FOR AN AIRCRAFT TURBOJET ENGINE PROVIDED WITH A HYDRAULIC ROTO-LINEAR ACTUATOR OF A THRUST REVERSER AND OF A VARIABLE-SECTION NOZZLE

CROSS-REFERENCE TO RELATED APPLICATIONS

This application is a continuation of International Application No. PCT/FR2016/053408, filed on Dec. 14, 2016, which claims priority to and the benefit of FR 15/62676 filed on Dec. 17, 2015. The disclosures of the above applications are incorporated herein by reference.

FIELD

The present disclosure relates to the field of actuators of thrust reverser cowls for a nacelle of an aircraft turbojet engine, and actuators of movable panels of a variable-section secondary nozzle of a nacelle.

BACKGROUND

The statements in this section merely provide background information related to the present disclosure and may not constitute prior art.

An aircraft is moved by several turbojet engines each housed in a nacelle also accommodating a set of auxiliary actuating devices relating to its operation and ensuring various functions when the turbojet engine is in operation or shut-down.

In particular, these auxiliary actuating devices comprise a mechanical thrust reverser system and a variable nozzle system.

The role of a thrust reverser, during the landing of an aircraft, is to improve the braking capability of the latter by redirecting forwards at least one portion of the thrust generated by the turbojet engine. In this phase, the thrust reverser allows directing forwardly of the nacelle all or part of the gas flows ejected by the turbojet engine, thereby generating a counter-thrust which is added to the braking of the wheels of the aircraft. For this purpose, a thrust reverser comprises on either side of the nacelle a movable cowl displaceable between, on the one hand, a deployed position which opens a passage in the nacelle intended for the diverted flow during the braking phase, and on the other hand, a stowed position which closes this passage during the normal operation of the turbojet engine or when the aircraft is at stop.

The movable cowls may fill a diverting function or simply activate other diverting means.

In the case of a cascade-type thrust reverser, the reorientation of the air flow is performed by cascade vanes, associated to reversal flaps which block a portion of the air circulation flow path, the cowl having a simple sliding function aiming at uncovering or recovering these cascade vanes.

Moreover, besides its thrust reversal function, the sliding cowl belongs to the rear section and presents a downstream side forming the ejection nozzle aiming at channeling the ejection of the air flows. In the case of a cascade-type thrust reverser, the sliding cowls are moved by actuators synchronized with each other and equipped with locks for retaining in the closed position in flight. In the case of such a hydraulically-controlled thrust reverser, the hydraulic actuators integrate inner screws which turn with the translation of their hydraulic rod. The rods are blocked in rotation by clevises for linkage to the movable cowl, thus the displacement is performed by a mere translation of the cylinder rods. A transmission and linking device by multiple wound-web flexible cables links the screws of the actuators to each other at the level of the fixed structure. Thus, the translational movement of the actuators is synchronized, consideration being made of the stiffness of the flexible cables which servo-control a homogeneous rotation of the screws. The optimum section of the ejection nozzle may be adapted depending on the different flight phases, namely the take-off, climb, cruise and descent phases.

It should be noted that the operating phases of the variable nozzle and of the thrust reverser are distinct from each other, the variable nozzle being inactivated when the thrust reverser is activated at landing.

Among the different embodiments of ejection nozzles known in the prior art, it is known in particular to perform the variation of the outlet section of the nozzle using one or several movable element(s), such as pivoting flaps.

In order to actuate the adaptive nozzle independently of the thrust reversal means, in particular during take-off, each movable portion (thrust reverser cowl/nozzle flaps) is moved by a set of actuators distinct for these two movements. This is in particular the case of the actuation system described in the document GB 2 449 281, in which the actuation of the nozzle is performed by an actuator having a telescopic rod displaceable in translation via a nut-and-screw system and whose screw is driven in rotation by a motor secured to a fixed portion of the nacelle, the thrust reverser cowl being, in turn, driven in translation by a set of independent actuators. A drawback of this embodiment is that there are duplicated activation control means between the movement of the thrust reverser and the movement of the nozzle actuation. In addition, the supply of energy and measurements of the cowl or of the variable nozzle flaps is made difficult because it is conveyed throughout the thrust reverser cowl, which, in turn, should be displaced at landing.

In order to reduce the weight of the nacelle, it has been proposed to use one single actuator comprising appropriate means for locking/unlocking the adaptive nozzle on the sliding thrust reverser cowl, thereby enabling a sequenced displacement of the thrust reverser cowl and of the nozzle, with one single actuator.

The document GB 2 446 441 describes such a control architecture for actuating both a thrust reverser device associated to a variable nozzle device, and provides for this purpose an actuator comprising two concentric pistons movable in translation, the first piston being connected to the thrust reverser cowl, and the second piston being linked to the nozzle, each piston being hydraulically controlled independently of each other.

This solution appears to be particularly complex to carry out. In addition, in this double-translation solution, guiding two movable elements poses issues in taking up the radial degrees of freedom because of the relative clearance between the thrust reverser cowl and its guide rails and because of aerodynamic deformations.

SUMMARY

The present disclosure provides a nacelle for an aircraft turbojet engine, comprising:
 a thrust reverser, comprising:
 a cowl displaceable between a deployed position which opens a passage in the nacelle intended for a diverted air flow and a stowed position which closes this passage;

a structure fixed relative to said cowl;

a variable-section secondary nozzle comprising a plurality of panels or flaps movable in rotation;

a plurality of hydraulic actuators for a sequenced actuation of said cowl and said panels, comprising:

a body mounted on said fixed structure; and a rod mounted in said body and linked, on the one hand, to said cowl and, on the other hand, to said panels via a device for transmitting the movement of the actuator to the panel; and at least one actuation system powering said actuator, comprising a hydraulic control device of said actuator adapted to control the displacement of the rod of the actuator, said nacelle being remarkable in that said actuator comprises a displacement device adapted to displace the rod alternately in translation relative to said body, so as to cause the translation of the thrust reverser cowl, or in rotation relative to said body, so as to cause the rotation of the panel or flap of the secondary nozzle.

Thus, thanks to the present disclosure, the movements and locking members are similar to a conventional thrust reverser system when the thrust reverser is controlled.

In addition, the remote rotation of the screws for orientating the panels or flaps of the secondary nozzle does not require any slider joint external to the actuator.

Besides, the hydraulic supply for the rotation and the measuring devices are accommodated directly within the fixed body of the cylinder, immovable relative to the fixed structure of the nacelle. Hence, it is not necessary to use complex stroke or over-length storage devices, as is the case in the prior art.

Finally, the kinematic joint between the rod of the actuator and the thrust reverser cowl includes on the one hand blocking the translation and on the other hand a fixed rotational movement from this point. Hence, it is not necessary to use any device for taking up the supplemental relative clearance during the movement of the thrust reverser cowl in flight induced by the variation of the pressure of the turbojet engine flow.

According to optional features of the nacelle of the present disclosure:

the actuator comprises means adapted to transmit the translational and rotational movement of the rod of said actuator to an actuator external to said actuator, in a synchronized manner;

the displacement device displacing the rod in rotation comprising:

a longitudinal groove arranged inside the rod;

a rotary inner axis, blocked in translation relative to the body, and comprising a slide engaging said groove;

an inner axis driving system for driving said inner axis in rotation;

the inner axis driving system for driving the inner axis in rotation comprising:

a rotary piston, meshing with said inner axis;

a piston driving system for driving said piston in rotation;

the piston driving system for driving the piston in rotation comprising:

a first set of teeth, arranged outside the piston;

a set of teeth, arranged inside the body, and meshing with the teeth of the piston;

a plurality of orifices CW, CCW for introducing a fluid, arranged in said body, on either side of said piston, the piston meshing with said inner axis thanks to a second set of teeth, arranged inside the piston, and meshing with a set of teeth, arranged outside the inner axis;

the teeth include simple- or multi-pitch helical teeth;

the teeth include reverse-pitch helical teeth;

the actuator further comprises a spring arranged so as to resist the displacement of the piston according to one of the directions of displacement of said piston;

a movement transmission device for transmitting the translational and rotational movement of the rod of the actuator, to an actuator external to said actuator, comprising:

a synchronization screw, comprising a set of teeth, arranged outside said screw;

a nut, mounted inside the rod, and meshing with the set of teeth of said screw;

a worm gear system adapted to receive a flexible shaft system intended to link the worm gear system of the actuator to a worm gear system of said device external to said actuator;

a set of rotary bearings, supporting said screw, said bearings being arranged on either side of said worm gear system, so as to block the translation of the synchronization screw relative to the body of the actuator;

the actuation system comprises a hydraulic supply doubled with hydraulic supply circuits, and control units supplying adjacent actuators of a thrust reverser cowl, for causing the rotation of the rod of the actuator;

the control units comprise a three-way servovalve supplying the body of the actuator via the orifice CW and an isolation valve supplying the body of the actuator via the orifice CCW;

alternatively, the control units are equipped with four-way servovalves;

the control units may be further equipped with "switch" type solenoid-valves capable of pressurizing the actuator via the orifice CW or the orifice CCW;

the actuation system comprises at least one anti-shock relief valve, allowing releasing the pressures induced by undesirable forces of the nozzle panels or flaps;

the nacelle comprises a flexible shaft linked between a first actuator of the thrust reverser cowl, and a second actuator of said cowl, adjacent to said first actuator, arranged to synchronize the translational and rotational movement of the rod of the first actuator with that of the second actuator; and the nacelle advantageously comprises a complementary flexible shaft linking:

the movement transmission device for transmitting the movement of the first actuator to the nozzle panel, and the movement transmission device for transmitting the movement of the second actuator to the nozzle panel, said complementary flexible shaft being arranged to synchronize the movement of the movement transmission device with that of the movement transmission device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
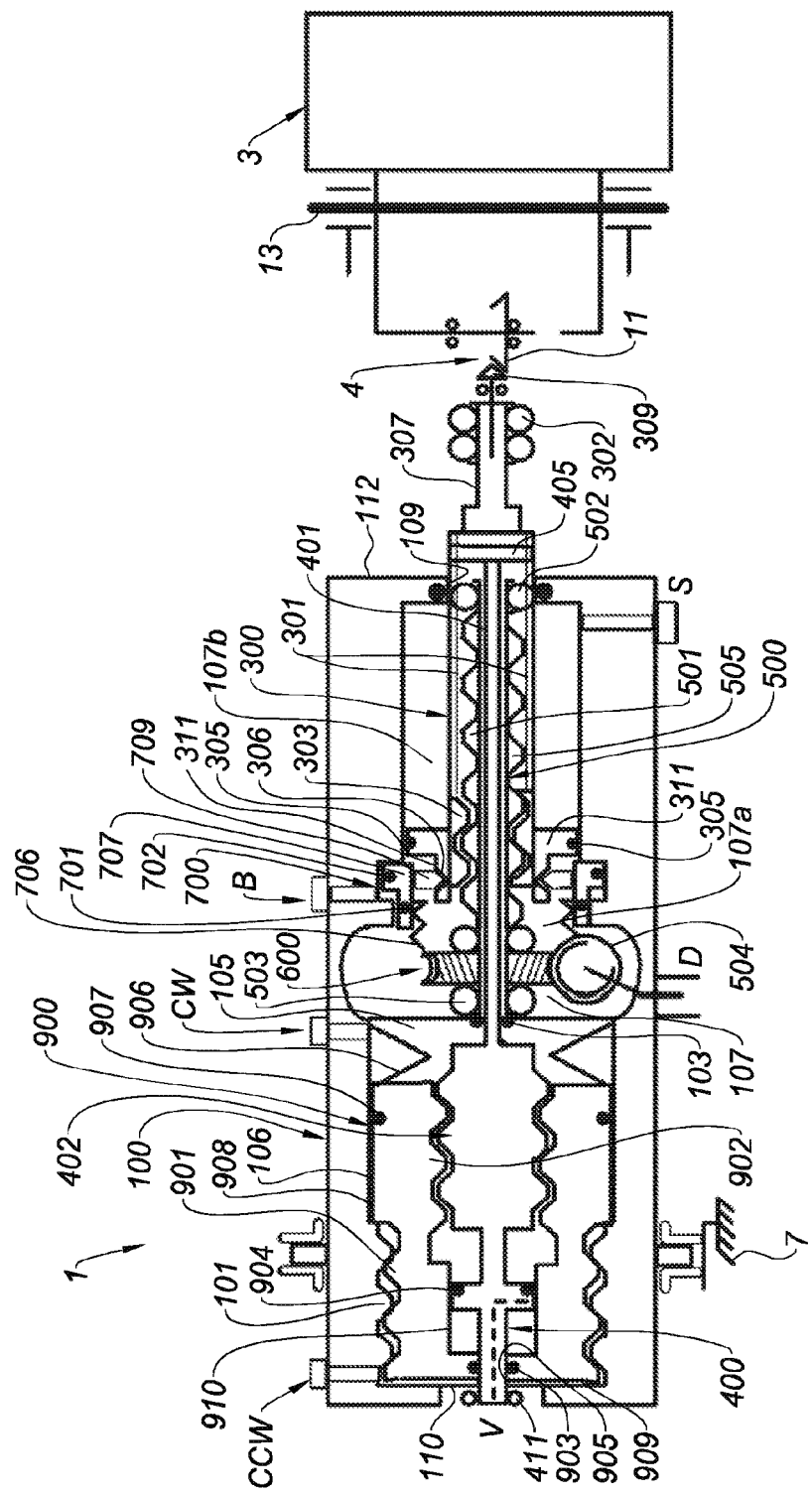
FIG. 1 illustrates an actuator in a retracted position and linked to a panel of a variable-section nozzle of a turbojet engine nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an actuator 1 is illustrated according to the present disclosure, represented in a retracted position.

The actuator which is represented in FIG. 1 is linked at its downstream portion to a panel 3 of a variable-section nozzle of a nacelle of a turbojet engine, via a movement transmission device 4. The actuator 1 is intended to be linked on the one hand to the nozzle panel 3, and on the other hand to a thrust reverser cowl 5 (shown in FIG. 5). It should be noted that in the present disclosure, the upstream and the downstream are defined with respect to the flow direction of air within the propulsion unit in direct jet operation, the air inlet being located upstream with respect to the ejection nozzle, located downstream of the nacelle.

The actuator 1 comprises a body 100 which is typically cylindrical. The body 100 is linked to a fixed structure 7 of a thrust reverser. The fixed structure 7 of the thrust reverser may include a front frame of the thrust reverser or any other fixed portion of the thrust reverser, with respect to the translating movable cowl of the thrust reverser. In particular, the linkage between the body 100 and the front frame may be achieved via a gimbal (not represented).

The body 100 may be constituted by a unitary set, as represented in FIG. 1, or it may further enclose a cylinder fixedly assembled to the body, for example thanks to a grommet/nut system, the sealing between the cylinder and the body 100 being achieved for example thanks to a static sealing gasket.

The body 100 defines at its inner portion a first cavity 105 and a second cavity 107 hermetically sealed from each other for example by a dynamic gasket 103 located at the downstream portion of the first cavity 105. The gasket 103 may be mounted on a rotary inner axis 400 which will be discussed in the following description.

The upstream portion of the first cavity 105 is delimited by a stop 110. The first cavity 105 presents two inlet orifices CW and CCW of a pressurized fluid when the actuator 1 is connected to a hydraulic control device, for example the hydraulic control device 9 represented in FIG. 5, which will be described in greater detail below. The cavity 105 is provided with a set of teeth 101. The teeth 101 are arranged inside the cavity 105, that is to say on an inner wall 106 of the cavity 105, over a length which may substantially correspond to half the length of this cavity. The teeth 101 may include trapezoidal teeth.

The second cavity 107 presents a first chamber 107a and a second chamber 107b hermetically sealed from each other by a sealed flange 311 fastened on a rod 300 substantially concentric with the cavity 107 and capable of being driven in translation or in rotation according to the present disclosure, as will be seen in the following description. The second cavity 107 of the body 100 presents an opening 109 arranged in an axial foldback 112 provided at the level of a downstream end of said body 100. The opening 109 is intended for the passage of the rod 300. The axial foldback 112 comprises a dynamic gasket 113 which provides sealing at the level of the downstream portion of the second cavity 107 when the rod 300 is displaced relative to the cavity 107. The second cavity 107 presents three inlet orifices B, D and S of a pressurized fluid when the actuator 1 is connected to the hydraulic control device 9.

According to the present disclosure, the rod 300 of the actuator can be alternately driven both in translation and in rotation relative to the body 100, thanks to appropriate means which will be described in the following description.

The rod 300 of the actuator 1 is partially housed within the second cavity 107 of the body 100, the end of this rod 300 passing through the opening 109 of the body 100. The rod 300 of the actuator 1 comprises a downstream end 307 comprising a linkage system on the one hand to the thrust reverser cowl 5 (represented in FIG. 5) and on the other hand to the nozzle panel 3. To this end, the end 307 of the rod 300 comprises a rotary bearing 302 intended to be fastened on the thrust reverser cowl 5 in order to enable a translational displacement of the cowl when the rod 300 translates relative to the body 100 of the actuator. The end 307 of the rod 300 also includes tip teeth 309 intended to mesh with a wheel 11 tangent to the rod 300 and belonging to the movement transmission device 4, the wheel 11 being capable of meshing with a connecting-rod linkage system arranged to enable a rotational displacement of the panel 3 about an axis of rotation 13 when the rod 300 is driven in rotation about its longitudinal axis.

As mentioned before, the rod 300 includes a sealed flange 311 fastened on the rod 300, for example at the level of an upstream end of the rod 300. The flange 300 is shaped so as to delimit the first and second chambers 107a and 107b of the second cavity 107 of the body 100, and is adapted to hermetically seal these first and second chambers 107a and 107b. To this end, the flange 311 is sealed for example by a dynamic gasket 305. The flange further includes a ramp 306 arranged so that a segmented locking set 700, stopped in translation on the body 100 of the actuator, but capable of moving radially, which enables or inhibits the translation of the rod 300.

The segmented locking system 700 includes a guide cap 707. The segmented locking system 700 includes a spring 706 enabling automatic pre-positioning of the segments 709 so as to automatically cock a translational locking sequence of the rod 300. To this end, the guide cap 707 includes a set of staggered linear dynamic gaskets 701, 702 so that the cap could be displaced under pressure against the spring 706.

The rod 300 also includes at its internal portion one or several groove(s) 301 (two are represented in FIG. 1). For example, the grooves 301 are profiled from the downstream end of a nut 303, also mounted inside the rod, up to an upstream portion of the end 307 of the rod 300.

The grooves 301 receive slides 405 rigidly assembled to the inner axis 400, for example by a screw (not represented) maneuvering in each groove 301 of the rod 300. The slides 405 are shaped so as to enable a translational displacement of the rod 300 relative to the inner axis 400.

The inner axis 400 passes throughout the entire body 100 of the actuator 1. The inner axis 400 is blocked in translation against rotary bearings 411 abutting against the stop 110 of the body 100.

The inner axis 400 includes a rod 401 extending substantially from the slides 405 up to a portion of the axis 400 having a set of teeth 402 arranged outside the inner axis 400. The inner axis 400 can be driven in rotation relative to the body 100 of the actuator by teeth 402, for example trapezoidal teeth, which mesh with teeth 902 of a rotary piston 900. Of course, any other appropriate system for driving the rod 400 in rotation may be considered instead of the teeth 402 which mesh with the teeth 902 of the rotary piston 900. When the inner axis 400 is driven in rotation, the slides 405 of the inner axis 400 which engage the profiled grooves 301 in the internal portion of the rod 300 cause the rotational movement of the rod 300. Similarly, as long as the inner axis 400 has not been driven in rotation by the piston 900, which may be held abutted against the body 100, either by springs 906, or by the pressurization of the first cavity 105 via the orifice CW, the inner axis 400 remains blocked in rotation and the slides 405 of the inner axis 400 thus inhibiting rotation of the rod 300.

In regards the rotary piston 900, the piston 900 is housed within the first cavity 105 of the body 100 of the actuator 1. The piston 900 presents an opening 905 arranged in an axial foldback 909 provided at the level of an upstream end of the piston 900. The opening 905 is intended for the passage of the inner axis 400, to enable a linkage to the rotary bearing 411, and also at the same time to enable a measurement of the rotation of the rotary inner axis, and therefore of the movement of the panels or flaps of the secondary nozzle, needed for the regulation system.

The piston 900 includes a set of teeth 901 arranged outside the piston, that is to say at the level of an outer wall 908 of the piston 900. The teeth 901 mesh with the set of teeth 101 arranged inside the cavity 105 of the body 100. The teeth 901 may include simple- or multi-pitch helical teeth.

The piston 900 further includes a set of teeth 902 arranged inside the piston, at the level of an inner wall 910 of the piston 900. The teeth 902 mesh with the set of teeth 402 arranged outside the inner axis 400. The teeth 902 may include trapezoidal teeth. In one form, the teeth 902 have a different and reversed pitch compared to the pitch provided for the teeth 901.

The piston 900 is represented in FIG. 1 against the upstream stop 101 of the body 100. As will be seen in the following description, the piston 900 is driven in a simultaneously rotational and translation movement by the helical profile of the teeth 901 when the piston 900 is subjected to a differential pressure between the inlet orifices CW and CCW.

The displacement of the piston in the body 100 may be held in a balanced position thanks to a setting of the differential pressure of the fluid which comes in into the cavity 105 of the body 100 via the orifices CW and CCW. As a complement or alternatively to the blocking of the movement of the piston by setting the differential pressure, the displacement of the piston may be blocked at will in an abutted state by the effect of the spring 906 and/or by the pressurization in the orifice CW alone, so as to press the piston 900 abutted against the body 100 and thus immobilize its rotation.

Other types of devices for blocking the piston may be provided, such as translating blocking pins or electrically or pressure-failure hydraulically controlled brakes (not represented herein).

A rotary dynamic gasket 903 is mounted between the piston 900 and the inner axis 400, at the level of the opening 905 of the piston 900. A rotary dynamic gasket 907 is mounted between the outer wall 908 of the piston 900 and the inner wall 106 of the cavity 105 of the body 100 so as to separate the two pressures connected to the orifices CW and CCW.

Similarly, a rotary dynamic gasket 904 may be provided between the inner wall 910 of the piston and the inner axis 400, in order to create differential sections between the orifices CW and CCW, for control.

According to the present disclosure, the actuator 1 is further equipped with a movement transmission device for transmitting the translational or rotational movement of the rod 300 of the actuator 1 to a device external to said actuator, for example an actuator 1' (shown in FIG. 5) adjacent to the actuator 1 and used to set the thrust reverser cowl 5 in movement. As known to those skilled in the art, the actuators of the same thrust reverser cowl may be mechanically synchronized by flexible shafts 15 (shown in FIG. 5) commonly known by the name "flexshaft".

In order to transmit the translational and rotational movement of the rod 300 of an actuator 1 to an actuator 1' (shown in FIG. 5), the flexible shaft 15 is piloted by a worm gear system comprising a wheel 600 meshing with a worm screw 504.

According to the present disclosure, the wheel 600 is crossed by a synchronization screw 500 comprising a rod 505, carried on the one hand by a set of bearings 502 at the downstream portion of the rod 505, and on the other hand by a set of rotary bearings 503 at the upstream portion of the rod 505. In one form, the bearings 502 are arranged inside the rod 300. The synchronization screw 500 is blocked in translation relative to the body 100 of the actuator 1 thanks to the rotary bearings 503, mounted on either side of the wheel 600. The rod 505 of the synchronization screw 500 is further crossed by the inner axis 400, the inner axis 400 being capable of turning freely inside the synchronization screw 500.

The rod 505 of the synchronization screw 500 includes a set of teeth 501, arranged outside the rod 505 of said screw 500. The teeth 501 may be trapezoidal. The teeth 501 mesh with the nut 303 mounted inside the rod 300, so that a translational movement of the rod 300 causes, via the nut 303 and the teeth 501, a rotational displacement of the synchronization screw 500 about its longitudinal axis. Similarly, when the rod 300 is driven in rotation, the synchronization screw is also driven in rotation.

Such a rotational movement of the synchronization screw 500 causes a rotational movement of the wheel 600 thanks to the rotary bearings 503, the rotation of the wheel 600 causing a rotation of the worm screw 504 which engages the wheel 600.

Complementary flexible shafts 29 (shown in FIG. 5) may be provided to directly synchronize the rotation of the wheel 11 of the movement transmission device 4 meshing with the actuator 1, with a wheel 11 of the movement transmission device 4' meshing with an adjacent actuator 1', in order to enable a redundancy of the force passage in the event of a failure of the actuator 1, such a failure may happen in particular because of a breakage of the inner shaft 400 of the actuator.

Figure 2:
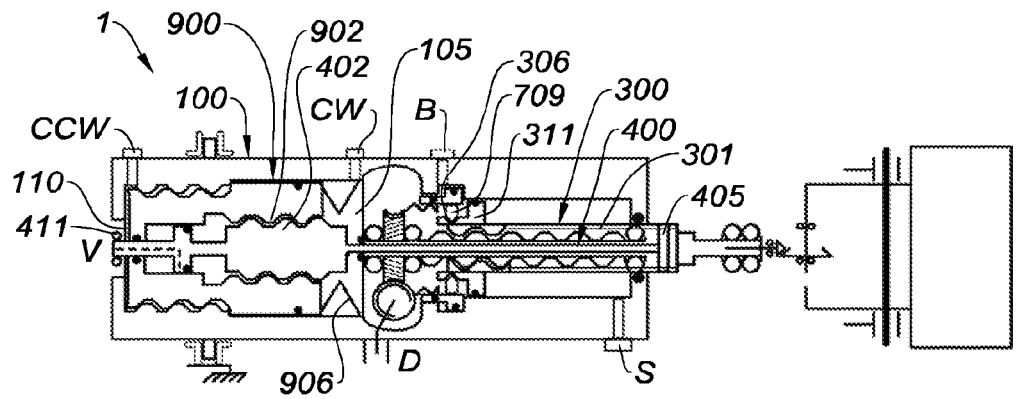
FIG. 2 illustrates an actuator in a retracted position according to the present disclosure.

The operation of the actuator 1 will now be described with reference to FIGS. 2 to 4 to which reference is made hereinafter.

The actuator 1 is at rest (FIG. 2), that is to say that the pressurized fluid inlet orifices do not receive any pressurized fluid. The segments 709 mesh with the ramp 306 of the flange 311 of the rod 300, which blocks the translation of the rod 300 relative to the body 100 of the actuator. Thus, the thrust reverser cowl (not represented) is blocked in translation.

The inner axis 400, which is blocked in translation against the bearings 411 by the effect of the spring 906 and/or the pressurization of the cavity CW, the bearings abutting against the stop 110 of the body 100 of the actuator, is also blocked in rotation because of the mating teeth 101, 901 and 402 and 902.

When the axis 400 is blocked in rotation, the rotation of the rod 300 is also inhibited thanks to the slides 405 of the inner axis 400 which engage the grooves 301 of the rod 300.

Figure 3:
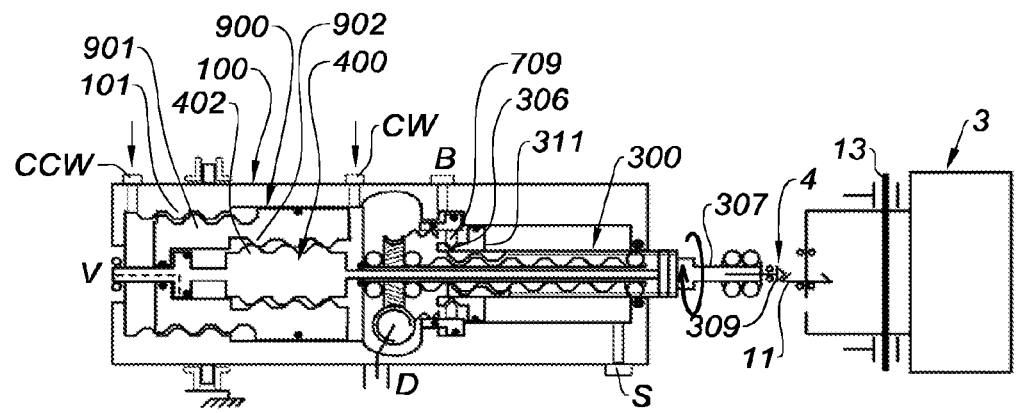
FIG. 3 illustrates an actuator in a position according to which a rod has undergone a rotation according to the present disclosure.

Referring now to FIG. 3 representing the actuator 1 in a position according to which the rod 300 has undergone a rotation.

Figure 5:
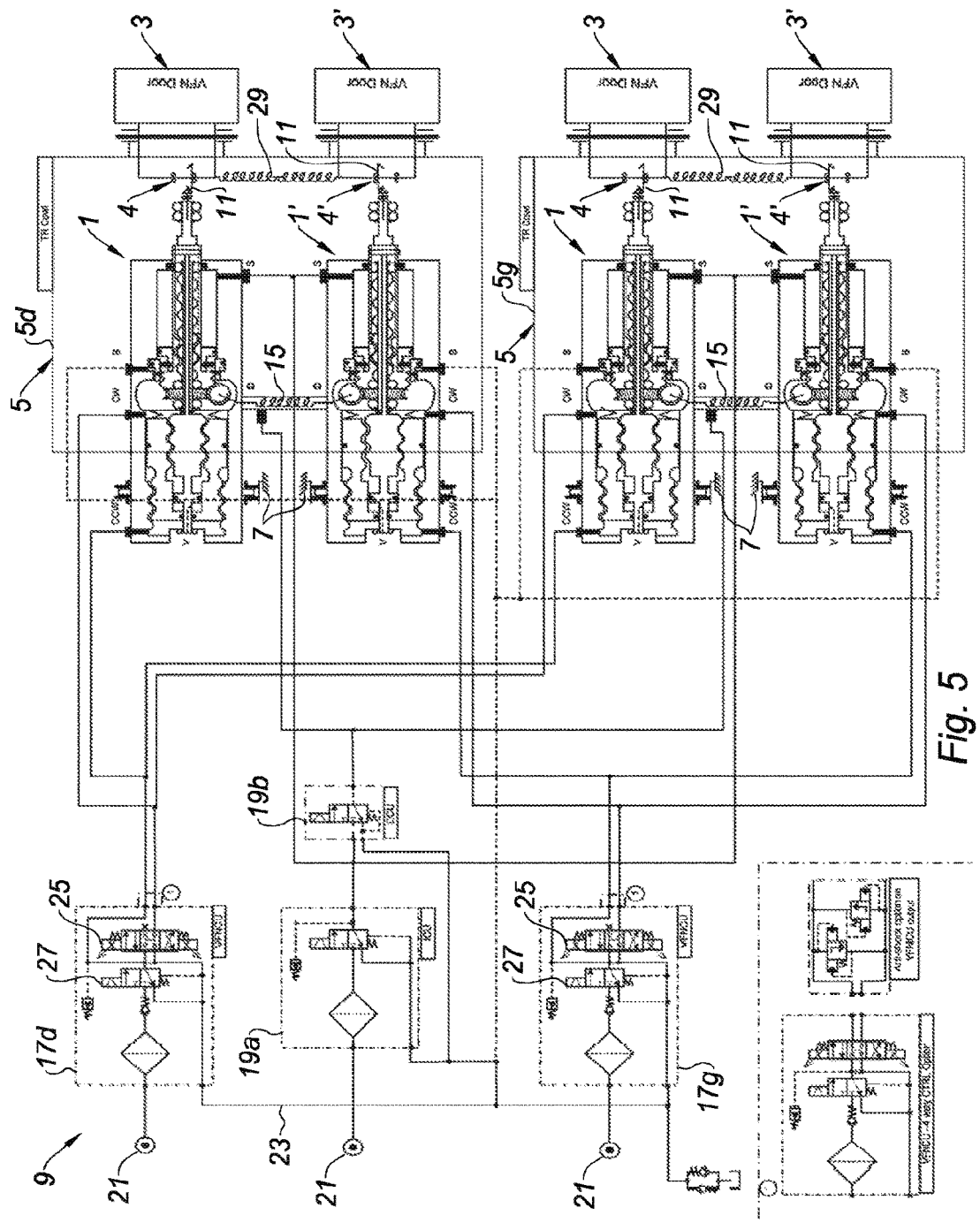
FIG. 5 illustrates a hydraulic control device powering a set of actuators according to the present disclosure.

In order to drive the rod 300 in rotation and consequently control the displacement of a panel 3 of the variable nozzle via the movement transmission device 4, the fluid inlet pressure is set in the cavity 105 of the body 100, via the orifices CW and CCW connected to the hydraulic control device 9 (represented in FIG. 5).

When introducing the pressurized fluid via the orifice CCW, the piston 900 is driven simultaneously in translation and in rotation within the body 100 thanks to the teeth 901 meshing with the teeth 101 of the body 100. The translational movement of the piston 900 drives the inner axis 400 in rotation relative to the piston 900 thanks to the teeth 902 of the piston 900 meshing with the teeth 402 of the inner axis 400, the translation of the rotary axis being blocked by the bearing 411. Thus, the inner axis 400 turns in a dual manner relative to the body 100, because it turns on the one hand relative to the piston 900 which, in turn, turns relative to the body 100, and the two rotations sum up algebraically. By reversing the pitch of the mating helical teeth 101, 901 and 902, 402, the two rotations are added in a common direction, for a reduced stroke of the rotary piston 900. The rotation of the inner axis 400 causes the rotation of the rod 300 thanks to the slides 405 of the inner axis 400 which engage the grooves 301 of the rod 300. In turn, the rod 300 is held blocked in translation relative to the body 100 of the actuator thanks to the segments 709 which engage the ramp 306 of the flange 311 of the rod. The rotation of the ramp 106 may either slip on the segments 709, or the segments 709 are driven in rotation by friction and turn on a rotary axial stop (not represented in the figure) relative to the body 100.

The rotation of the rod 300 of the actuator drives, via its tip teeth 309 at its end 307, the wheel 11 of the movement transmission device 4, tangent to said rod and meshing with the connecting-rod linkage system arranged to enable the rotational displacement of the panel 3 about its axis of rotation 13, so as to set the outlet section of the nacelle.

Of course, any other movement transmission device may be used to transmit the rotational movement of the rod of the actuator to the variable nozzle panel so as to drive this panel in rotation.

The stroke of the rotary piston remains limited because of the differential pitch of the helical teeth 901 and 902 of the piston 900, which allows obtaining a small rotation of the nozzle panels 3 (90 to 300¬∞ for example). Moreover, the wheel 11 of the movement transmission device 4 and the tip teeth 309 of the screw 300 of the actuator enable a slow rotation of the nozzle panels 3, under a significant torque. The rotary inner axis 400 may be equipped with a rotation detection system ("RVDT" or "resolver") to measure the accurate rotation thereof. In this manner, the measurement of the position of the panels 3 or flaps may be used in an angular position feedback loop which continuously modulates the pressure in the cavity 105 at the level of the orifices CW and CCW, thereby controlling the movement of the rotary piston 900, and therefore the rotations of the inner axis 400 and consequently of the panels 3 or flaps of the nozzle, with respect to a desired steering setpoint of the panels or flaps of the secondary nozzle depending on the flight phase, as described below.

At the same time, while the rod 300 is turning and its translation remains blocked by the segments 709, it drives in rotation the inner synchronization screw 500 of the actuator, which causes the rotation of the wheel 600 and the tangent transmission screw 504. Thus, the flexible shafts 15 turn simultaneously during the rotation of the rod 300. Since the actuators 1 and 1' (shown in FIG. 5) are controlled simultaneously, the rotations of their respective transmission screw 504 are comparable and are synchronized via the flexible shaft 15, thereby causing uniform rotations of all the panels 3 or flaps of the nozzle.

As indicated above, the complementary flexible shafts 29 (shown in FIG. 5) may be provided to directly synchronize the rotation of the wheel 11 of the movement transmission device 4 meshing with the actuator 1, with a wheel 11 of the movement transmission device 4' meshing with an adjacent actuator 1', in order to enable a redundancy of the force passage in the event of a failure of the actuator 1, such a failure may happen in particular because of a breakage of the inner shaft 400 of the actuator.

Thus, if the actuator 1 is not powered, or if the inner axis 400 of the actuator is broken, the flap 3' of the adjacent actuator 1' remains driven in rotation via the flexible shaft 29.

Figure 4:
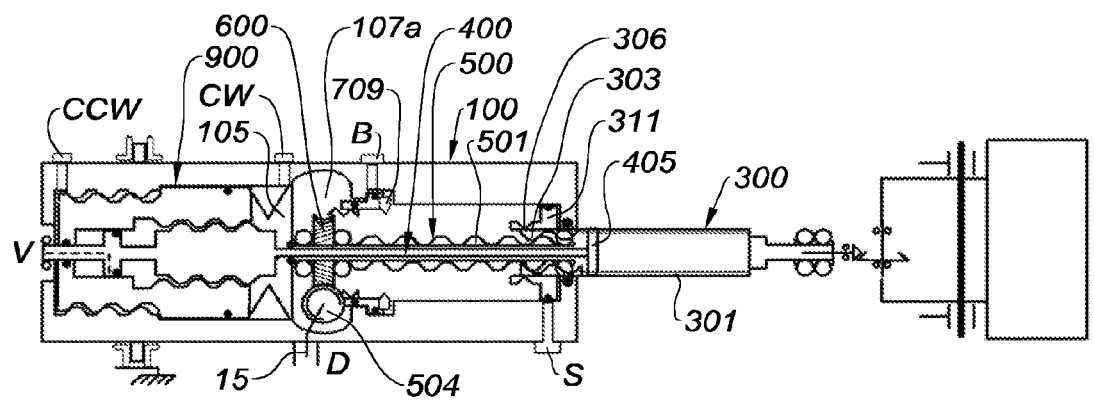
FIG. 4 illustrates an actuator in a position according to which a rod of the actuator has been removed according to the present disclosure.

Referring now to FIG. 4 representing the actuator 1 in a position according to which the rod 300 has undergone a translation.

At landing, the nozzle panels are positioned in a particular extreme stowed position which is no longer freely regulated in the intermediate position. Holding the nozzle panels in position in this extreme position is provided thanks to a predetermined setting of the pressure of the fluid which comes in into the cavity 105 of the body 100 via the orifice CW, and/or thanks to the spring 906 acting in compression against the piston, and/or thanks to a blocking pin and/or thanks to a pressure-failure hydraulic brake. Thus, the rotation of the piston 900 is blocked, thereby blocking the translation of the inner axis 400.

When a translation of the rod 300 downstream of the actuator is desired, the guide cap 707 is moved in translation by pressurizing the first chamber 107a via the orifice D. When the first chamber 107a is not pressurized, the segments 709, by the effect of the tension of the rod 300 tend to expand because of the reaction of the profile of the ramp 306. The presence of the guide cap 707 inhibits the deviation of the segments, and the rod 300 remains locked. During the pressurization of the first chamber 107a, the guide cap 707 is stowed and the tension of the rod 300 results in a tangential expulsion of the segments 709 which detach from the ramp 36, thereby releasing the movement of the rod 300. In order to facilitate the stowing of the cap, the prior pressurization of the second chamber 107b via the orifice S allows not forcing the segments 709 along the guide cap 707, thereby avoiding a "loaded" unlocking phenomenon. When in the locked position, the segmented locking system cannot inhibit the rotation of the rod 300, either because the angles of frictions and reactions cannot inhibit it, or because of a complementary bearing device (not represented), which enables the free guided rotation of the segments in the body, while inhibiting its translation.

When the segments 709 have cleared the ramp 306 of the flange 311 of the rod 300, the fluid pressurized in the chamber 107a of the cavity 107 of the body 100 via the orifice D enables a translational displacement of the rod 300 downstream the actuator, so as to open the thrust reverser cowl. The translational displacement of the rod 300 is enabled whereas the rotational movement of the rod 300 is blocked by the slides 405 of the inner axis 400 which engage the grooves 301 of the rod, the inner axis 400 being blocked in rotation thanks to the piston 900 being held in a fixed position.

The translational displacement of the rod 300 causes, thanks to the nut 303 of the rod, meshing with the teeth 501 of the synchronization screw 500, the rotation of the synchronization screw 500. The rotation of the synchronization screw 500 enables, via the flexible shaft 15 driven by the worm gear system 600, 504, a synchronization of the actuators linked to this flexible shaft.

When it is desired to displace the rod 300 upstream of the actuator, the movement of the piston 900 is blocked as described hereinbefore, which allows inhibiting the rotation of the inner axis 400. The rod 300 is displaced in translation by introducing a pressurized fluid into the chamber 107b, via the port S.

When the rod 300 returns back to its closure position, it compresses a follower piston (nor represented) which has held the segments 709 in the raised position. Henceforth, the segments pushed by the cap 707 compressed by the spring 706 are capable of slipping along the ramp 306 which are positioned opposite the locking point during the closure of the rod 300. The cap 707 pushed by the springs 706 is then positioned radially so as to block again the expansion capability of the segments 709, thereby completing the mechanical locking phase of the segmented locking set 700.

FIG. 5 represents a hydraulic control device 9 of a set of actuators 1 and 1' of the thrust reverser cowl 5 and of the variable-section nozzle panels 3, 3'.

The cowl 5 can be driven in translation by four hydraulic actuators 1 and 1' according to the present disclosure, and the nozzle panels 3, 3' or flaps can be driven in rotation by the actuators 1 and 1' respectively via the movement transmission devices 4, 4'. The actuators 1' are mechanically synchronized with the actuators 1 by the flexible shafts 15. This enables the piloted actuators to transmit their movement to possibly faulty actuators. Similarly, the complementary flexible shafts 29 allow synchronizing the rotation of the wheel 11 of the movement transmission device 4 meshing with the actuator 1, with the wheel 11 of the movement transmission device 4' meshing with the adjacent actuator 1'. Thus, if the actuator 1 is not powered, or if the inner axis 400 of the actuator is broken, the flap 3' of the adjacent actuator 1' is driven in rotation via the flexible shaft 29.

The thrust reverser cowl 5 refers to two half-cowls 5d, 5g, "d" and "g" respectively referring to a right and left half-semicircle of the nacelle. Alternatively, the thrust reverser cowl may also include one single cowl substantially peripheral to the nacelle, the four actuators 1 and 1' then being disposed in pairs at each side of a longitudinal axis of the nacelle.

Piloting of the actuator 1 and 1' is performed by two control units 17d, 17g adapted to pilot the actuators 5 according to a variable nozzle mode, and a set of control units 19a and 19b adapted to pilot the actuators 1 and 1' according to a thrust reversal mode.

The control units 17d, 17g of the set 19a, 19b are connected to a pressurized fluid supply 21 as well as to a pressurized fluid return circuit 23. In one form, the units 17d and 17g are supplied by distinct pressure sources of the aircraft, in order to keep at least one pair of actuators supplied in the event of a default of one of the two supply circuits of the aircraft. In contrast, both units 19a and 19b may be supplied indifferently by any of these two circuits.

According to the nozzle mode, each of the control units 17d, 17g supplies a pair of actuators 1 and 1' in parallel with hydraulic fluid. For safety reasons, the actuators assigned to each control unit 17d, 17g are cross-connected, that is to say that the control unit 17d supplies an actuator 1 positioned in the right portion of the nacelle and an actuator 1 positioned in the left portion of the nacelle. The same applies to the control unit 17g. The diagram of FIG. 5 represents a solution for supplying two pairs of actuators, but may be extended in the same manner to three actuators per cowl, regulated by a shared supply, one of the actuators being piloted by the control unit 17d, and the two other actuators being piloted by the control unit 17g, and vice versa on the other thrust reverser cowl.

Each control unit 17d, 17g comprises a three-way servovalve 25 and an electrically-controlled supply isolation valve 27. In one form, the isolation valve 27 is always powered whereas the servovalve 25 is regulated only in the nozzle supply mode. In the event of a "loading" phenomenon subsequently to a deviation of the servovalve 25, the pressurization of the orifices CW and CCW of the actuator provokes an improvised rotation of the panels 3 or flaps, detected by the RVDT sensor of the rotary inner axis 400. The controller then shuts off the pressurization valve and the actuator is left in a free position, pushed by the spring 906 toward its folded position. Nonetheless, the regulation enables the adjacent actuators powered by the other control unit 17g to drive the depressurized actuators thanks to the main flexible shafts 15 and thanks to the optional complementary flexible shafts 29 positioned at the level of the movement transmission device 4.

In one form, the regulation unit which carries out this control is the FADEC ("Full Authority Digital Engine Control"), not represented in the figures, provided for the engine control which has an input and an output for conditioning a RVDT measurement, pressure sensors, pressurization solenoid-valve supply, a proportional torque motor, capable of powering a similar servovalve for controlling the fuel or air supply geometries of the turbojet engine. The FADEC is conventionally split into two distinct channels powered and controlled separately in parallel or in a master-slave manner, and is therefore fully suited for this type of two-way regulations of such a system. The servovalve 25 is an appropriate three-way servovalve, when the piston 900 has a differential section between the orifices CW and CCW, as previously disclosed. In this case, the reduced section supplied via the orifice CW is directly supplied with the pressure downstream the isolation valve 27, whereas the larger section supplied via the port CCW is modulated by the servovalve 25, which reloads or unloads the pressure of the chamber depending on the angular position of the panels or flaps 3, 3', with respect to a setpoint.

Alternatively, when the rotary piston 900 has identical sections, the servovalve 25 may be replaced with a four-way type servovalve, allowing modulating the two chambers of the actuator in a proportional manner, that is to say that the pressure increases in one of the chambers and proportionally decreases in the other, depending on the control current of the servovalve.

Alternatively, it is possible to provide the outlets of the servovalves supplying the orifices CW and CCW of the actuators with anti-shock relief valves 31, which allows limiting the pressure peaks induced by momentary overloads of aerodynamic forces in the panel 3, 3'.

Alternatively, if the needed accuracy of the regulation is not stringent, and/or if the need for displacing the panels or flaps is intermittent and sequential, it is possible to replace the servovalves 25 with control solenoid-valves and equip the actuator with systems for blocking the rotary piston 900, with a pressure-failure hydraulic brake, with an engaging pin or other immobilization devices known to those skilled in the art Alternatively, if it is desired to position the panels or flaps 3, 3' in an open position or in a closed position, without any other intermediate position, it is possible to replace the servovalves 25 with "switch" or "ON/OFF" type solenoid-valves known to those skilled in the art, which pressurize the cavity 105 of the actuator via the orifice CW or via the orifice CCW of the rotary piston 900.

In the various forms for controlling the nozzle panels or flaps that have been described, the capability of synchronizing the nozzle panels 3, 3' or flaps with each other and the capability of dealing with the loss of a hydraulic supply or of a simple breakage of the transmission drivetrain, such as a breakage of the shaft of the rotary piston 900, have been preserved thanks to:

a shared supply by two distinct control units 17d and 17g, and/or a distribution of the supply of the pairs of actuators 1 and 1' on a given cowl 5, and/or the mechanical drive retroaction by the synchronization flexible shafts 15 and by the complementary flexible shafts 29.

It goes without saying that the present disclosure is not limited to any single variant of the nacelle including such a system for actuating the actuators, described hereinabove only as illustrative examples, but it comprises on the contrary all variants involving technical equivalents of the described means as well as their combinations if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine comprising:
    a thrust reverser including a cowl displaceable between a deployed position which opens a passage in the nacelle for diverting air flow, and a stowed position which closes the passage;
    a fixed structure relative to said cowl; and
    a variable-section secondary nozzle comprising a plurality of panels or flaps movable in rotation;
    a plurality of hydraulic actuators operable to sequentially actuate said cowl and said panels or flaps, each hydraulic actuator comprising a body mounted on said fixed structure, and a rod mounted in said body, and linked to said cowl and said panels or flaps via a movement transmission device, wherein the movement transmission device transmits movement of said hydraulic actuator to said panels or flaps; and
    at least one actuation system for powering said hydraulic actuators, the at least one actuation system comprising a hydraulic control device connected to said hydraulic actuators and adapted to control displacement of the rods of the hydraulic actuators,
    wherein said hydraulic actuators each comprise a displacement device which alternately displaces the rod in translation relative to said body to cause translation of the thrust reverser cowl or in rotation relative to said body to cause rotation of said panels or flaps of the variable-section secondary nozzle.

2. The nacelle according to claim 1, wherein each of the plurality of hydraulic actuators comprise the movement transmission device adapted to transmit translational and rotational movement of the rod of said hydraulic actuator to an external actuator external to said hydraulic actuators in a synchronized manner.

3. The nacelle according to claim 1, wherein each displacement device comprises:
    a longitudinal groove arranged inside the rod;
    a rotary inner axis, blocked in translation relative to the body, and comprising a slide engaging the longitudinal groove; and
    an inner axis driving system to drive the rotary inner axis in rotation.

4. The nacelle according to claim 3, wherein the inner axis driving system comprises: a rotary piston adapted to mesh with the rotary inner axis; and a piston driving system to drive the rotary piston in rotation.

5. The nacelle according to claim 4, wherein the inner axis driving system comprises:
    a set of teeth arranged outside the rotary piston;
    a set of teeth arranged inside the body, and adapted to mesh with the set of teeth outside the rotary piston; and
    a plurality of orifices for introducing a fluid, and arranged in said body on either side of said rotary piston, wherein said body meshes with said rotary inner axis via a set of teeth arranged inside the rotary piston, the set of teeth inside the rotary piston meshing with a set of teeth arranged outside the rotary inner axis.

6. The nacelle according to claim 5, wherein the set of teeth outside the rotary piston are simple- or multi-pitch helical teeth.

7. The nacelle according to claim 5, wherein the set of teeth outside the rotary piston are reverse-pitch helical teeth.

8. The nacelle according to claim 5, wherein each of the plurality of hydraulic actuators further comprise a spring configured to resist displacement of the rotary piston according to a direction of displacement of said rotary piston.

9. The nacelle according to claim 2, wherein the movement transmission device comprises:
    a synchronization screw including a set of teeth arranged outside said synchronization screw;
    a nut mounted inside the rod, the nut configured to mesh with the set of teeth of said synchronization screw;
    a worm gear system adapted to receive a flexible shaft system, the flexible shaft system operable to link the worm gear system of the hydraulic actuator to the worm gear system of the external actuator external to said hydraulic actuator; and a set of rotary bearings for supporting said synchronization screw, said bearings arranged on either side of said worm gear system to block translation of the synchronization screw relative to the body of the hydraulic actuator.

10. The nacelle according to claim 1, wherein the at least one actuation system comprises:

a hydraulic supply doubled with hydraulic supply circuits; and control units supplying adjacent actuators of the plurality of hydraulic actuators of the thrust reverser cowl, the control units configured to cause the rods of the plurality of hydraulic actuators to rotate.

11. The nacelle according to claim 10, wherein the control units of the at least one actuation system each comprise a three-way servovalve supplying the bodies of the plurality of hydraulic actuators via a first orifice and an isolation valve supplying the bodies of the plurality of hydraulic actuators via a second orifice.

12. The nacelle according to claim 10, wherein the control units of the at least one actuation system are equipped with four-way servovalves.

13. The nacelle according to claim 11, wherein the control units of the at least one actuation system are equipped with switch type solenoid-valves capable of pressurizing the plurality of hydraulic actuators via the first orifice or the second orifice.

14. The nacelle according to claim 1, wherein the at least one actuation system comprises at least one anti-shock relief valve operable to release pressure induced by undesirable forces of the variable-section secondary nozzle panels or flaps.

15. The nacelle according to claim 1 further comprising a flexible shaft linked between a first actuator of the plurality of hydraulic actuators of the thrust reverser cowl, and a second actuator of the plurality of hydraulic actuators of the thrust reverser cowl, wherein the second actuator is adjacent to the first actuator such that translational and rotational movement of the rod of the first actuator synchronizes with translational and rotational movement of the rod of the second actuator.

16. The nacelle according to claim 15 further comprising a complementary flexible shaft linking:

the movement transmission device for transmitting movement of the first actuator to at least one of the plurality of panels or flaps of the variable-section secondary nozzle, and the movement transmission device for transmitting movement of the second actuator to at least one of the plurality of panels or flaps of the variable-section secondary nozzle, wherein the complementary flexible shaft is configured to synchronize the movement of the movement transmission device of the first and second actuators.

* * * * *